UNITED STATES PATENT OFFICE 2,280,058

CYANOETHYLATION OF CARBOCYCLIC COMPOUNDS

Herman A. Bruson, Philadelphia, Pa., assignor to The Resinous Products & Chemical Company, Philadelphia, Pa., a corporation of Delaware No Drawing. Application May 2, 1941, Serial No. 391,501

11 Claims. (Cl. 260—465)

This invention relates to a method for the β-cyanoethylation of reactive methylene or methenyl groups of carbocyclic compounds and to the new products obtained thereby.

I have discovered that organic compounds having a reactive hydrogen-bearing carbon atom between two ethenoid carbon atoms in an unsaturated carbocycle react with acrylonitrile in the presence of an alkaline condensing agent, whereby one or more hydrogen atoms of the said carbon atom become replaced by the β-cyanoethyl radical —CH₂CH₂CN.

For example, the hydrocarbon fluorene reacts readily with acrylonitrile in the presence of an alkaline condensing agent to form 9,9-di-(β-cyanoethyl)-fluorene as follows:

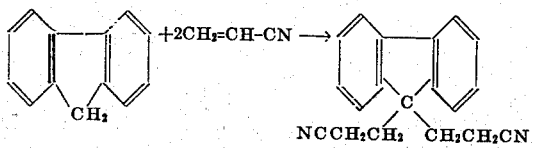

In a similar manner, anthrone reacts with two mols of acrylonitrile to form di-(β-cyanoethyl) anthrone:

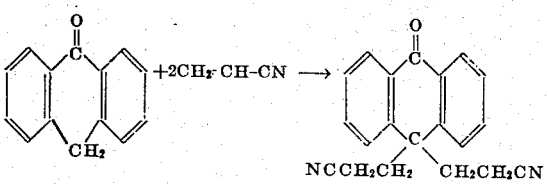

Instead of an active methylene group as shown in the illustrations with fluorene and anthrone a methenyl group between ethenoid groups of a carbocycle may be reacted with acrylonitrile to give a mono-β-cyanoethyl derivative. Examples of compounds having reactive methenyl groups include 9-methyl fluorene, 9-benzyl fluorene, 1-methyl indene, 1-benzyl indene, etc.

In the case of some compounds more than two hydrogen atoms are available for replacements. For example, indene contains three reactive hydrogen atoms and forms di-β-cyanoethylation products and a tri-β-cyanoethylation product, probably as follows:

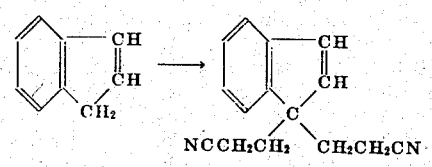

or

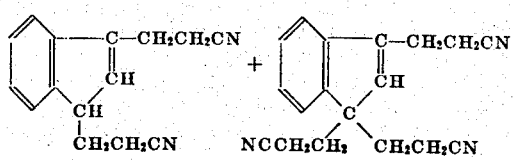

Cyclopentadiene reacts vigorously with acrylonitrile in the presence of an alkaline condensing agent to form β-cyanoethylation products which are entirely different from the already known Diels-Alder adducts which are obtained by heating α,β-unsaturated nitriles with 1,3-dienes in the presence of certain catalysts, as described in British Patent No. 341,047 and U. S. Patent No. 2,217,632. For example, according to the present invention, cyclopentadiene condenses at moderate temperature in the presence of trimethyl benzyl ammonium hydroxide with acrylonitrile to form a series of liquid lower β-cyanoethylation products together with a crystalline higher poly-cyanoethylation product melting at 203° C., which appears to be a hexa-β-cyanoethyl derivative formed probably according to the equation:

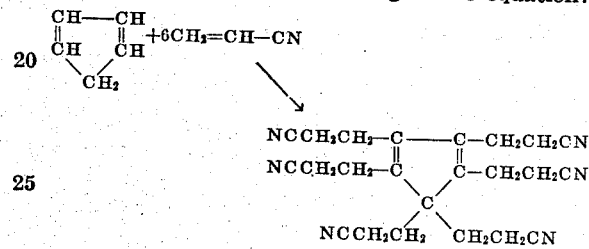

This reaction probably results from migration of hydrogen and shift of double bonds, resulting in active methylene groups successively at the different positions. The same mechanism is undoubtedly responsible for introduction of the several groups in different positions in indene. In general, it appears that when carbocyclic compounds possess an active methylene or methenyl group between ethenoid groups, the acrylonitrile first reacts with this group. If then the configuration is such as to permit a shift of ethenoid groups with formation of a new active methylene group between said groups, the reaction may proceed with the introduction of the β-cyanoethyl group in a second position.

Analogous reactions occur with the nuclear substituted derivatives of the above carbocyclic compounds, for example, the alkyl, aryl or aralkyl indenes, the nitro, chloro, or bromo fluorenes, alkyl or aralkyl cyclopentadienes, alkyl anthrones, and the like.

Among the alkaline condensing agents which have been found effective for promoting the reaction are the oxides, hydroxides, hydrides, amides, and alcoholates of the alkali metals or the alkali metals themselves. There may also be used strongly basic non-metallic hydroxides such as the quaternary ammonium hydroxides. Of these a particularly effective product is the aqueous solution containing 40% of trimethyl benzyl ammonium hydroxide, which is commercially available under the trade name "Triton B." One or several of these alkaline materials are suspended or, preferably, dissolved in the reactive carbocyclic compound itself or in a solution thereof in an inert liquid such as dioxane, ether, benzene, or in a liquid which is less reactive than the reacting components, such as water, or tertiary butyl alcohol. The condensation takes place readily at temperatures ranging from about 0° to about 80° C., although initial temperatures of 25° C. to 60° C. are preferred. The reaction is usually exothermal so that cooling, at least during the initial part of the condensation, is generally advantageous in order to control the vigor of the reaction and to prevent undesired polymerization or side reactions. In this connection it is sometimes desirable to add polymerization inhibitors such as hydroquinone, eugenol, finely divided copper, copper compounds, or sulfur, etc.

The quantity of alkaline condensing agent required is relatively small, amounts of the order of 1% to 10% on the combined weight of the reactants usually being sufficient.

The cyanoethylation products obtainable by the present process are new compounds. They are useful as intermediates for the preparation of mono-carboxylic or poly-carboxylic acids, amides, esters, amines or polyamines, amidines, amino-acids, cyano-acids, or thio-amides by the usual reactions characteristic of the nitrile group. Many of the compounds may find uses in diverse fields including synthetic resins, artificial fibres, plastics, plasticizers, pharmaceuticals, dyes, insecticides and other commercial applications.

The following examples illustrate this invention, it being understood that, although trimethyl benzyl ammonium hydroxide is the preferred alkaline condensing agent, others, such as sodium methylate, potassium tertiary amylate, potassium hydroxide, sodium metal, sodium hydride, sodium oxide, tetramethyl ammonium hydroxide, benzyl triethyl ammonium hydroxide, and other strongly basic hydroxides may be used.

*Example 1*

To a solution of 49 g. of fluorene (0.3 mol), 200 g. of dioxane, and 4 g. of aqueous 38% trimethyl benzyl ammonium hydroxide, there was added dropwise 31.8 g. of acrylonitrile (0.6 mol) during 25 minutes while the reaction mixture was stirred and maintained at 30–36° C. by means of external water-cooling. The dark solution obtained was then stirred two hours longer at room temperature and acidified with dilute hydrochloric acid. The mixture was shaken up with an equal volume of ethylene dichloride and washed thoroughly with water. The ethylene dichloride layer was filtered and evaporated under reduced pressure on a steam bath to a viscous oil. The yield was 80 grams. To this oil 200 cc. of ethanol was added whereupon the oil crystallized. The crystals weighed 52.5 g. after filtration and air-drying. Upon recrystallization from hot ethanol, the product formed colorless crystals melting at 121° C. Its analysis agreed with that of di-(β-cyanoethyl)-fluorene having the formula

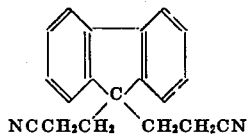

Upon saponification by boiling with excess 10% potassium hydroxide solution for 12 hours and acidifying, the above compound is converted to the corresponding dicarboxylic acid, which is a colorless, crystalline substance melting at 273–274° C.

*Example 2*

15.9 g. of acrylonitrile was added dropwise during 30 minutes to a stirred solution consisting of 29.1 g. of anthrone, 100 g. of dioxane, and 3 g. of aqueous 38% trimethyl benzyl ammonium hydroxide while the reaction mixture was maintained at 40° C. A deep red solution resulted and this was stirred for one hour at 35° C., and then allowed to stand 18 hours. Upon neutralization the red color disappeared. The product separated in crystalline form. The yield was 40 grams. After recrystallization from glycol monoethyl ether, it formed colorless prisms melting at 215° C., having the formula

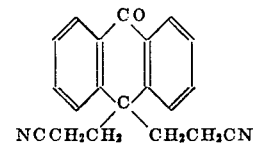

The original filtrate was washed with water, and extracted with ethylene dichloride. Upon evaporation of the extract, a crystalline residue was obtained which yielded 6 g. of additional product, M. P. 215° C., after recrystallization from the glycol monoethyl ether.

*Example 3*

To a solution of 20 g. of 2-nitro-fluorene, 150 g. of dioxane, and 2 g. of aqueous 38% trimethyl benzyl ammonium hydroxide there was added dropwise during 20 minutes 10.6 g. of acrylonitrile, while the reaction mixture was stirred and cooled to 35–40° C. The mixture was stirred for two hours longer, then neutralized with dilute hydrochloric acid and the crystalline product which resulted was filtered off. The yield was 21 grams. Upon recrystallization from glycol monoethyl ether, the compound formed yellow needles melting at 236–237° C., having the formula

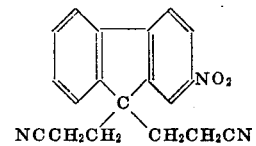

*Example 4*

To a mixture of 69.5 g. of indene (0.6 mol), 100 g. of dioxane, and 4 g. of aqueous 38% trimethyl benzyl ammonium hydroxide there was added dropwise during two hours 95.4 g. of acrylonitrile (1.8 mol) while the reaction mixture was stirred and cooled to 25–30° C. After the addition, the mixture was stirred at room temperature for an hour and the dark solution acidified with dilute hydrochloric acid and mixed with water and ethylene dichloride. The aqueous layer was discarded and the ethylene dichloride layer washed until acid-free and then dried under reduced pressure on a steam bath. The residue was a dark red, viscous oil weighing 147 g., containing 13.82% nitrogen. Upon distillation in high vacuo, a fraction boiling between 210° and 220° C./2 mm. came over as a pale yellow oil containing 12.61% nitrogen, corresponding to a di-(cyanoethyl) indene having the probable formula

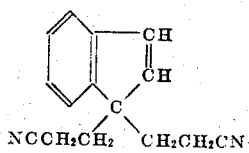

or

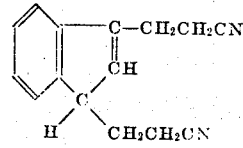

The main fraction distilled over at 280–290° C./1–2 mm. as a viscous, reddish oil which gradually crystallized on standing. Upon recrystallization from ethanol, the compound separated in colorless, stout prisms melting at 65° C. and analyzing for a tri-(cyanoethyl)-indene, having the probable formula

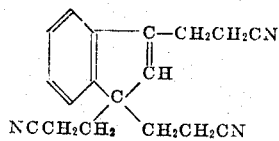

*Example 5*

Acrylonitrile (106 g.) was added dropwise during two hours to a stirred, cooled mixture of 66 g. of cyclopentadiene, 100 g. of dioxane, and 4 g. of aqueous 38% trimethyl benzyl ammonium hydroxide while the reaction temperature was kept at 20–25° C. The mixture was stirred for three hours longer at 20° C., then neutralized with dilute hydrochloric acid. During the condensation the mixture became almost black in color but bleached to a pale yellow when the acid was added. The crystalline product was filtered off and air-dried. It weighed 34 grams and consisted of a tan-colored powder. Upon recrystallization from boiling glycol monomethyl ether, it separated in colorless needles melting at 203° C. Analysis indicated the compound to contain six cyanoethyl groups.

The original filtrate, when washed and concentrated in vacuo, formed a thick, brown oil containing a mixture of lower cyanoethylation products of cyclopentadiene, part of which can be distilled in high vacuum as a thick, pale yellow oil.

I claim:

1. The process for introducing a —CH₂CH₂CN group on a carbon atom of an unsaturated carbocyclic compound having a reactive hydrogen-bearing carbon atom between two ethenoid carbon atoms thereof, which comprises reacting said carbocyclic compound with acrylonitrile in the presence of an alkaline condensing agent.

2. A process of introducing a —CH₂CH₂CN group on a carbon atom of an unsaturated carbocyclic compound having a reactive hydrogen-bearing carbon atom between two ethenoid carbon atoms thereof, which comprises reacting said carbocyclic compound with acrylonitrile in the presence of a quaternary ammonium hydroxide.

3. A process for introducing a —CH₂CH₂CN group on a carbon atom of an unsaturated carbocyclic compound having a reactive hydrogen-bearing carbon atom between two ethenoid carbon atoms thereof, which comprises reacting said carbocyclic compound with acrylonitrile in the presence of trimethyl benzyl ammonium hydroxide.

4. A process for the β-cyanoethylation of an unsaturated carbocyclic hydrocarbon having a reactive hydrogen-bearing carbon atom between two ethenoid carbon atoms thereof, which comprises reacting said hydrocarbon with acrylonitrile in the presence of an alkaline condensing agent.

5. A process for preparing 9,9-di-(β-cyanoethyl)-fluorene which comprises condensing fluorene and acrylonitrile in the presence of trimethyl benzyl ammonium hydroxide.

6. A process for preparing di- and tri-(β-cyanoethyl)- indene which comprises condensing indene and acrylonitrile in the presence of trimethyl benzyl ammonium hydroxide.

7. A process for preparing poly-(β-cyanoethyl)-cyclopentadiene which comprises condensing cyclopentadiene and acrylonitrile in the presence of trimethyl benzyl ammonium hydroxide.

8. As a new product, a carbocylic organic compound in which a β-cyanoethyl radical is attached to a carbon atom which is between two ethenoid carbon atoms in an unsaturated carbocycle.

9. As a new compound, 9,9-di-(β-cyanoethyl)-fluorene

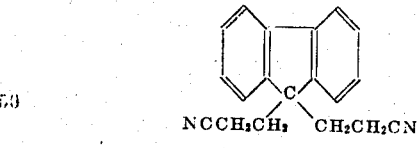

10. As a new compound, tri-(β-cyanoethyl)-indene.

11. As a new compound, hexa-(β-cyanoethyl)-cyclopentadiene.

HERMAN A. BRUSON.